(12) United States Patent
Ala et al.

(10) Patent No.: US 11,221,633 B2
(45) Date of Patent: Jan. 11, 2022

(54) GYROSCOPIC ATTITUDE CONTROL SYSTEM

(71) Applicant: Raytheon Company, Waltham, MA (US)

(72) Inventors: Eero H. Ala, Tucson, AZ (US); Christopher P. Owan, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 451 days.

(21) Appl. No.: 15/156,507

(22) Filed: May 17, 2016

(65) Prior Publication Data

US 2017/0336807 A1    Nov. 23, 2017

(51) Int. Cl.
| | |
|---|---|
| *G05D 1/08* | (2006.01) |
| *B64G 1/24* | (2006.01) |
| *B64G 1/28* | (2006.01) |
| *B64C 19/00* | (2006.01) |

(Continued)

(52) U.S. Cl.
CPC .......... *G05D 1/0808* (2013.01); *B64C 19/00* (2013.01); *B64G 1/244* (2019.05); *B64G 1/286* (2013.01); *G01C 19/04* (2013.01); *B64G 2001/245* (2013.01); *F42B 10/025* (2013.01)

(58) Field of Classification Search
CPC .... G05D 1/0808; G05D 1/0883; B64G 1/286; B64G 2001/245; G01C 19/04; F42B 10/025
See application file for complete search history.

(56) References Cited

U.S. PATENT DOCUMENTS

| | | | | |
|---|---|---|---|---|
| 1,186,856 A | * | 6/1916 | Sperry ................... | G01C 19/38 114/122 |
| 2,158,180 A | * | 5/1939 | Goddard ................. | F42B 15/01 244/79 |

(Continued)

FOREIGN PATENT DOCUMENTS

| | | | |
|---|---|---|---|
| EP | 0 392 130 A1 | 10/1990 | |
| EP | 0392130 A1 * | 10/1990 | ............... B64G 1/28 |

OTHER PUBLICATIONS

International Search Report and Written Opinion for corresponding International Application No. PCT/US2016/062439 dated Feb. 24, 2017.

*Primary Examiner* — Zakaria Elahmadi
(74) *Attorney, Agent, or Firm* — Renner, Otto, Boisselle & Sklar, LLP (57) ABSTRACT

An attitude control system includes one or more control moment gyro pairs, with gyros of individual of the pairs being counter-rotated to rotate the rotation axes of flywheels of the gyros of a gyro pair in opposite direction. The flywheels of a gyro pair may be in paddle configuration, with the rotation axes of the flywheels rotating in the counter-rotation through separate planes as the gyros are rotated. The rotation of the gyros of a gyro pair may be accomplished by coupling both of the gyros to a servo motor with suitable coupling gears, or by using independent servos for each gyro. The counter-rotation of gyros of an individual pair produces a resultant torque about a fixed global axis, such as the axis of a flight vehicle of which the attitude control system is a part. Further control may be accomplished for example by varying rotation speeds of the flywheels.

22 Claims, 6 Drawing Sheets

(51) Int. Cl.
    *G01C 19/04* (2006.01)
    *F42B 10/02* (2006.01)

(56) References Cited

U.S. PATENT DOCUMENTS

| | | | | |
|---|---|---|---|---|
| 3,158,340 A * | 11/1964 | Sellers | | G01C 21/18 244/79 |
| 3,416,752 A * | 12/1968 | Hembree | | F41G 7/2213 244/3.17 |
| 3,476,129 A * | 11/1969 | Halstenberg | | G01C 21/18 137/38 |
| 5,256,942 A * | 10/1993 | Wood | | B64G 1/28 318/649 |
| 6,113,033 A * | 9/2000 | Parks | | B64G 1/283 244/165 |
| 6,729,580 B2 * | 5/2004 | Shultz | | B64C 17/06 244/79 |
| 7,181,987 B2 * | 2/2007 | Hamady | | A63B 21/22 74/5.12 |
| 8,327,728 B2 * | 12/2012 | Carlson | | G01C 19/06 74/5.37 |
| 8,555,734 B2 * | 10/2013 | Elms | | B62D 37/06 74/5.37 |
| 8,876,060 B2 * | 11/2014 | Nagabhushan | | B64G 1/28 244/164 |
| 8,897,933 B1 * | 11/2014 | Teller | | B64B 1/00 701/15 |
| 10,202,208 B1 * | 2/2019 | Sanyal | | B64G 1/286 |
| 2004/0216538 A1 * | 11/2004 | Hamady | | A63B 21/22 74/5.12 |
| 2006/0032985 A1 * | 2/2006 | Smith | | B64G 1/283 244/165 |
| 2008/0035797 A1 * | 2/2008 | Defendini | | B64G 1/286 244/165 |
| 2010/0044517 A1 * | 2/2010 | Bialke | | B64G 1/286 244/165 |
| 2010/0122859 A1 * | 5/2010 | Schroll | | B62D 57/00 180/54.1 |
| 2010/0132489 A1 * | 6/2010 | Harrison | | F16H 33/10 74/5.22 |
| 2011/0011982 A1 | 1/2011 | Herman et al. | | |
| 2011/0016996 A1 * | 1/2011 | Suda | | B61C 17/06 74/5.1 |
| 2011/0219893 A1 * | 9/2011 | Fiala | | B64G 1/285 74/5.34 |
| 2012/0199697 A1 * | 8/2012 | Nagabhushan | | B64G 1/286 244/165 |
| 2013/0055839 A1 * | 3/2013 | Pan | | F16H 25/2219 74/424.87 |
| 2016/0107769 A1 * | 4/2016 | Verbin | | G01C 19/30 244/165 |
| 2016/0184993 A1 * | 6/2016 | Brandwijk | | A63B 33/04 700/258 |
| 2016/0297650 A1 * | 10/2016 | Bang | | B66C 13/085 |
| 2017/0029139 A1 * | 2/2017 | Anania | | B64G 1/286 |

* cited by examiner

GYROSCOPIC ATTITUDE CONTROL SYSTEM

FIELD OF THE INVENTION

The invention is in the field of attitude control systems, such as attitude control systems used for flight vehicles.

DESCRIPTION OF THE RELATED ART

Control of flight vehicles, such as hypersonic vehicles, can be a challenging problem, due a number of non-linear phenomena. Control surfaces are not useful for space vehicles, or where the atmosphere is too thin for them to result in sufficient drag forces. Reaction wheels are inefficiency, although simple to use. Prior control moment gyros (CMGs) have greater torque efficiency, but suffer from numerous disadvantages, such as axial crosstalk, operational complexity, and singularities.

In view of this history there is room for an improved attitude control system, usable for flight vehicles such as space vehicles or hypersonic vehicles.

SUMMARY OF THE INVENTION

An attitude control system includes a pair of aligned flywheels that are counter-rotated relative to one another, to produce a resultant torque in only one direction, and/or that is about an axis equidistant between the flywheels.

An attitude control system includes a pair of flywheels that are configured to be selectively rotated in opposite directions about a common axis, in order to produce a torque.

According to an aspect of the invention, an attitude control system includes: a control moment gyro pair that includes: a first control moment gyro that includes a first flywheel rotatably mounted to a first frame, wherein the first flywheel rotates relative to the first frame about a first flywheel rotation axis; a second control moment gyro that includes a second flywheel rotatably mounted to a second frame, wherein the second flywheel rotates relative to the second frame about a second flywheel rotation axis; and an actuator that selectively counter-rotates the first control moment gyro, and the second control moment gyro, so as to rotate the first flywheel rotation axis and the second flywheel rotation axis in opposite directions.

According to an embodiment of any paragraph(s) of this summary, the actuator rotates the first flywheel and the first frame, and the second flywheel and the second frame, so as to rotate the first flywheel rotation axis and the second flywheel rotation axis within respective offset parallel planes.

According to an embodiment of any paragraph(s) of this summary, the first control moment gyro and the second control moment gyro are both rotated by the actuator about a common gyro pair rotation axis.

According to an embodiment of any paragraph(s) of this summary, the gyro pair rotation axis is perpendicular to planes in which the flywheel rotation axes rotate when the control moment gyros are rotated.

According to an embodiment of any paragraph(s) of this summary, the first control moment gyro includes a first spin motor for rotating the first flywheel about the first flywheel rotation axis, relative to the first frame; and the second control moment gyro includes a second spin motor for rotating the second flywheel about the second flywheel rotation axis, relative to the second frame.

According to an embodiment of any paragraph(s) of this summary, the spin motors are servo motors.

According to an embodiment of any paragraph(s) of this summary, the spin motors are variable speed motors.

According to an embodiment of any paragraph(s) of this summary, the actuator includes a motor.

According to an embodiment of any paragraph(s) of this summary, a shaft of the motor engages gearing on the frames.

According to an embodiment of any paragraph(s) of this summary, the control moment gyro pair is a first control moment gyro pair.

According to an embodiment of any paragraph(s) of this summary, the system includes a second control moment gyro pair and a third control moment gyro pairs.

According to an embodiment of any paragraph(s) of this summary, the control moment gyro pairs control attitude about respective control moment axes.

According to an embodiment of any paragraph(s) of this summary, the control moment axes are all perpendicular to one another.

According to an embodiment of any paragraph(s) of this summary, the system includes a controller that is operatively coupled to the control moment gyro pairs, to control the control moment gyro pairs to achieve a desired attitude about the control moment axes.

According to an embodiment of any paragraph(s) of this summary, the controller controls counter-rotation of gyros of the control moment gyro pairs.

According to an embodiment of any paragraph(s) of this summary, the controller controls spin rate of flywheels of gyros According to an embodiment of any paragraph(s) of this summary, the controller is an adaptive controller, able to compensate for reductions in functionality of one or more of the gyros.

According to an embodiment of any paragraph(s) of this summary, the controller is a machine learning controller.

According to an embodiment of any paragraph(s) of this summary, the attitude control system is part of a flight vehicle.

According to another aspect of the invention, an attitude control system includes: three control moment gyro pairs for controlling attitude in respective control moment axes, wherein each of the control moment gyro pairs includes: a first control moment gyro that includes a first flywheel rotatably mounted to a first frame, wherein the first flywheel rotates relative to the first frame about a first flywheel rotation axis; a second control moment gyro that includes a second flywheel rotatably mounted to a second frame, wherein the second flywheel rotates relative to the second frame about a second flywheel rotation axis; and an actuator that selectively counter-rotates the first control moment gyro, and the second control moment gyro, so as to rotate the first flywheel rotation axis and the second flywheel rotation axis in opposite directions.

According to yet another aspect of the invention, a method of controlling attitude of a flight vehicle includes: selectively counter-rotating gyros of individual gyro pairs, each of the gyro pairs controlling attitude about a respective control moment axis of the flight vehicle; wherein the counter-rotating produces a moment only about the control moment axis corresponding to the gyro pair.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

An attitude control system includes one or more control moment gyro pairs, with gyros of individual of the pairs being counter-rotated to rotate the rotation axes of flywheels of the gyros of a gyro pair in opposite direction. The flywheels of a gyro pair may be in paddle configuration, with the rotation axes of the flywheels rotating in the counter-rotation through separate planes as the gyros are rotated. The rotation of the gyros of a gyro pair may be accomplished by coupling both of the gyros to a servo motor with suitable coupling gears, or by using independent servos for each gyro. The counter-rotation of gyros of an individual pair produces a resultant torque about a fixed global axis, such as the axis of a flight vehicle of which the attitude control system is a part. Further control may be accomplished by varying the rotation speeds of the flywheels, such as by use of variable speed motors and by use of variable speed servo motors to counter-rotate the gyro pairs independently or in concert. In addition the attitude control system may be configured to compensate for the loss of one or more of the gyros by changing the operation of the remaining gyros (the flywheel rotation speeds and/or angles of the remaining gyros).

Figures 1, 2, 3:
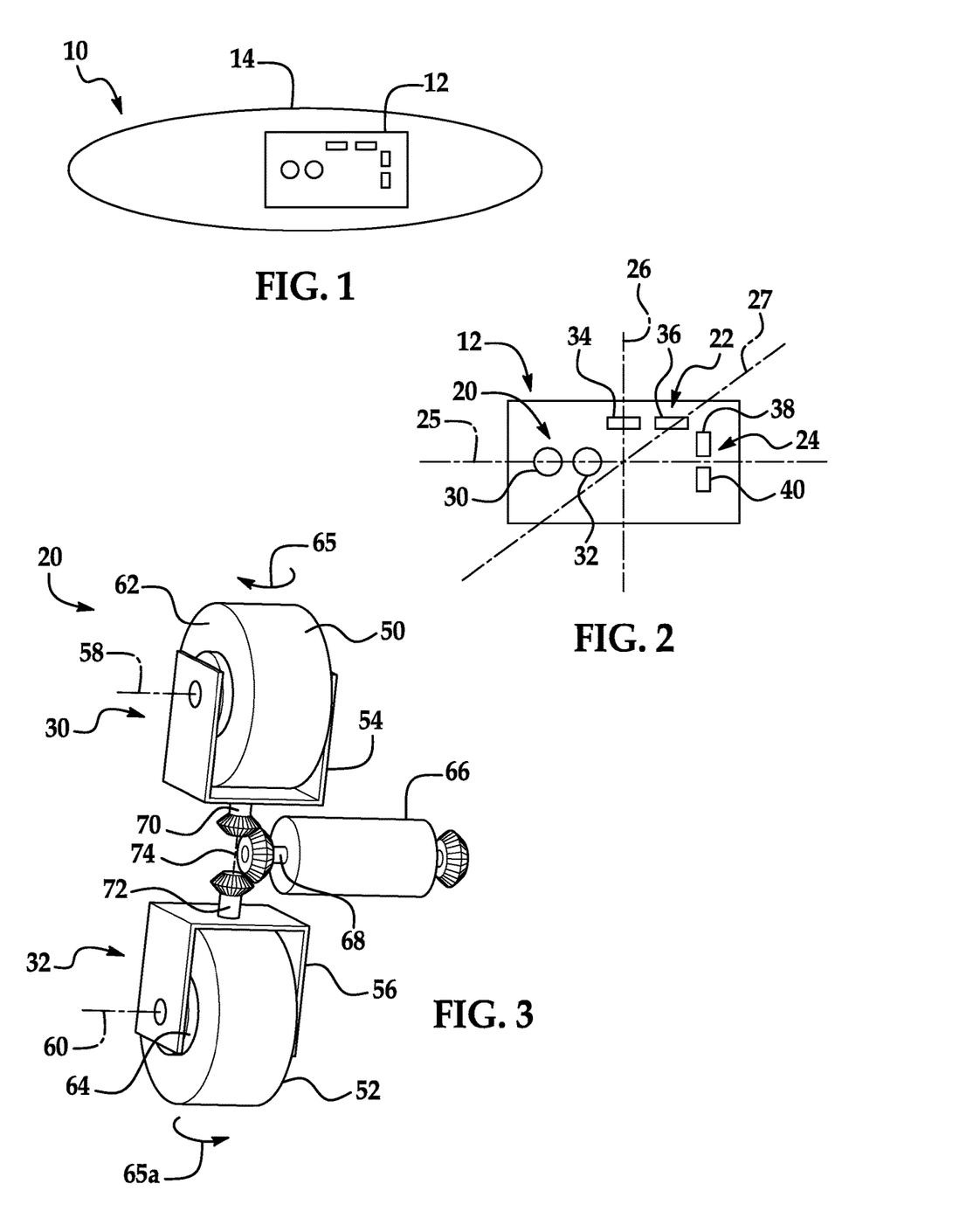
FIG. 1 is a schematic drawing of a flight vehicle that includes an attitude control system in accordance with an embodiment of the present invention.
FIG. 2 is a schematic drawing of the attitude control system of FIG. 1.
FIG. 3 is an oblique view of parts of a gyro pair of the attitude control system of FIG. 2.

FIG. 1 shows a flight vehicle 10 such as a spacecraft or a missile. An attitude control system (ACS) 12 is located in a fuselage 14 of the flight vehicle 10, for changing the attitude of the flight vehicle 10 during its flight. The attitude control system 12 is internal to the fuselage 14, without any control surfaces or other parts that extent into the space around the fuselage 14. The flight vehicle 10 may be any of a wide variety of flight vehicles, such as satellites, other spacecraft, aircraft (manned or unmanned), missiles, hypersonic vehicles, vehicles that fly in both the atmosphere and in space, etc.

With reference now in addition to FIG. 2, the ACS 12 includes three control moment gyro pairs 20, 22, and 24, for effecting changes in attitude of the flight vehicle 10 in three respective axes 25, 26, and 27, such as for causing rotations in the roll, pitch, and yaw directions. The three axes may orthogonal, such as roll, pitch, and yaw are, or alternatively may have a non-orthogonal relationship to one another. The control moment gyro pairs 20, 22, and 24 each include a pair of gyroscopes, and a motor or other actuator or mechanism for rotating the gyroscopes. The gyro pair 20 includes gyroscopes 30 and 32, the gyro pair 22 include gyroscopes 34 and 36, and the gyro pair 24 includes gyroscopes 38 and 40. The gyroscopes in each gyro pair may be configured in a paddle configuration (shown in FIGS. 4-6 and described further below), or in a scissor configuration (shown in FIG. 11 and described further below). In the paddle configuration the axes for the flywheels of the individual gyros are counter-rotated by the motor or other mechanism, and the angular momentum vector from each gyro remains in an offset parallel plane. In the scissor configuration the angular momentum vectors remain co-planar. The counter-rotation may be accomplished by rotating the gyroscopes of an individual gyro pair about the same axis, using the motor or other mechanism. The configurations of the gyroscopes of each of the gyro pairs 20, 22, and 24 may be different, with the gyros of one of the gyro pairs configured to rotate orthogonally to the gyros of other of the gyro pairs.

FIG. 3 shows further details of the gyro pair 20, and its gyroscopes 30 and 32. The gyroscopes 30 and 32 have respective flywheels (or spinning masses) 50 and 52, able to rotate relative to respective frames or carrier housings (or housings) 54 and 56, about respective flywheel axes 58 and 60. The flywheels 50 and 52 are turned about the axes 58 and 60 by respective spin motors 62 and 64. An actuator, such as a motor 66, is operatively coupled to the frames 54 and 56 to selectively counter-rotate the gyros 30 and 32, rotating the flywheel 50 and the frame 54 together in a first direction 65, and at the same time counter-rotating the flywheel 52 and the frame 56 together in a second direction 65*a* that is opposite the first direction. The rotation of the gyros 30 and 32 in opposite directions may be accomplished by suitable gearing operatively coupled to the motor 66. For example there may be bevel gear connections between a motor shaft 68 of the motor 66, and respective rotation shafts 70 and 72 that are parts of the housings 54 and 56.

In the illustrated embodiment the rotation shafts 70 and 72, defining the respective axes about which the gyroscopes 30 and 32, are coincident. This means that the gyroscopes 30 and 32 both rotate about the same axis 74. Alternatively the gyroscopes 30 and 32 may rotate about different axes, for example about axes that are offset from one another.

The motor 66 may be a suitable electrical motor. As an alternative to the single motor 66, separate motors could be used to turn the gyroscope 30 and the gyroscope 32. Also, turning devices (actuators) other than the motor 66 could be used to rotate the gyroscopes 30 and 32. The rotation could be performed by a variety of types of electric motors, such as DC brush motors, DC brushless motors, servo motors, or stepper motors. Other possibilities include a nonelectric hydraulic actuator, or a compressed gas turbine. The same actuator may be used to drive multiple gyro pairs, if desired.

The spin motors 62 and 64 may be constant-speed motors or variable-speed motors. As described further below, with variable-speed spin motors the spin rates of the flywheels 50 and/or 52 may be varied during operation of the ACS 12 (FIG. 2) in order to achieve several benefits. Variable-speed spin motors add to the operational flexibility of the ACS 12. Variable-speed operation allows for lower power consumption when maneuvers are not needed. Variable-speed operation also allows for better object tracking of moving objects with changing vectors. When the rotation speed of the flywheels 50 and 52 is reduced, as may be done selectively with variable-speed spin motors, the life of the system may be extended. Further, use of variable speed allows the avoidance of singularities in operation of the ACS 12 with reduced numbers of gyroscopes, such as if one or more of the gyroscopes ceases operation. Such singularities are caused when gyros of an ACS are moved into a configuration, such as a physical orientation or combination of physical orientations, where they will not produce a torque.

The rotation motor 66 may also be a variable-speed motor, although it may be a constant-speed motor.

Although FIG. 3 shows only details of the gyro pair 20, similar details may be present for the other gyro pairs 22 and 24. The gyro pairs 22 and 24 may be offset at angles to the gyro pair 20 (and to each other), for example by being orthogonal to one another.

Figure 4:
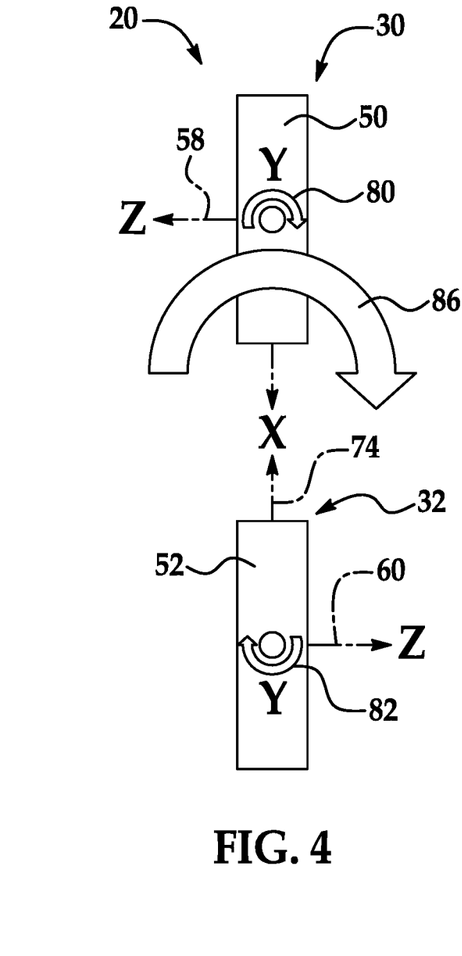
FIG. 4 shows a first (parallel planar) configuration of the gyro pair.
Figure 5:
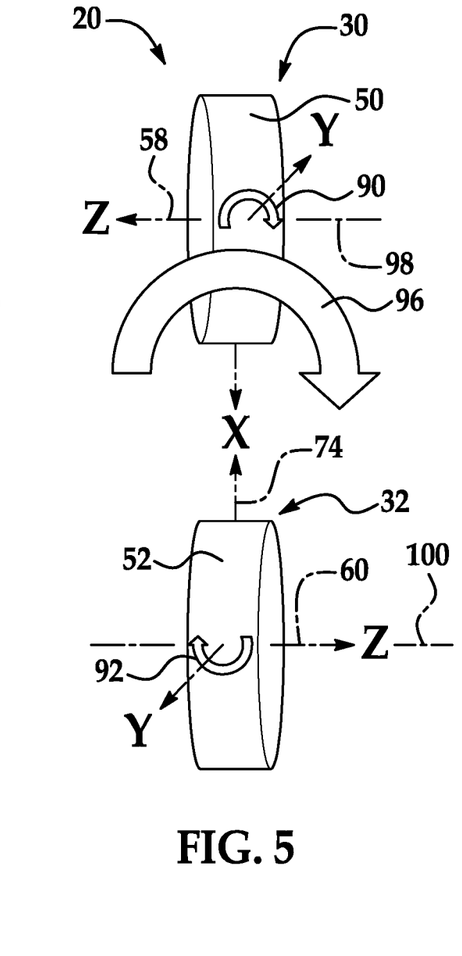
FIG. 5 shows a second (moderately counter-rotated) configuration of the gyro pair.
Figure 6:
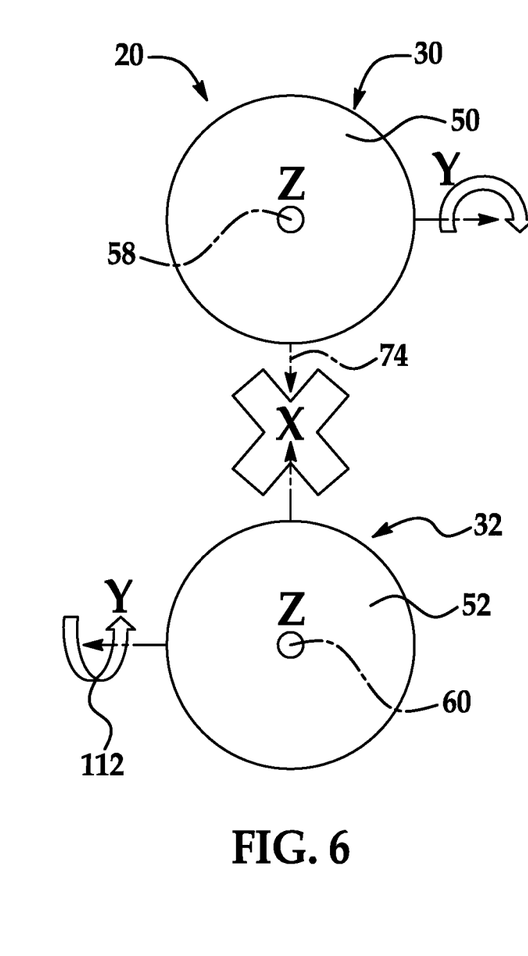
FIG. 6 shows a third (null configuration) of the gyro pair.

FIGS. 4-6 illustrate operation of the gyro pair 20 in various configurations (stages or rotation). FIG. 4 shows a configuration where the gyros 30 and 32 have not been rotated. The flywheels 50 and 52 are in line and with their rotation axes in opposite directions. Rotating the gyros 30 and 32 from this configuration, about the common axis 74, produces torques from both of the flywheels 50 and 52 in the clockwise directions, as shown at 80 and 82 in FIG. 4. The resultant torque 86 is the addition of these two torques from the rotation of the gyros 30 and 32 that include the individual rotating flywheels 50 and 52. All of the resultant torque is in a single plane, which is the desired moment to be imparted to the flight vehicle. There are no moments out of this plane.

The configuration shown in FIG. 4 illustrates the orientation that produces the maximum torque efficiency for the gyro pair 20, as the gyros 30 and 32 are counter-rotated relative to one another. With some rotation the gyro pair reaches the condition shown in FIG. 5, where the individual gyros 30 and 32 have been rotated about their common gyroscope rotation axis 74. The flywheels 50 and 52 still rotate about their flywheel rotation axes 58 and 60. However the rotation of the gyros about their common rotation drive shaft axis 74 means that some of the resultant torques 90 and 92 caused by further rotation of the gyros 30 and 32 about the common axis 74 is out of the plane of the desired moment to be produced on the flight vehicle. But since the gyros 30 and 32 have been counter-rotated, that is rotated in different (and opposite) directions about the common axis 74, the out-of-plane components of the torques produced by the gyros 30 and 32 cancel each other out yet the in-plane component of the torques produced by gyros 30 and 32 sum together to produce the resultant torque 96. This means that the resultant torque 96 is still fully in the desired plane, the plane of torque for which it is desired to produce a moment on the flight vehicle 10 (FIG. 1), to change the attitude of the flight vehicle 10. Nonetheless this resultant in-plane torque 96 is reduced relative to the torque that is produced when the gyro pair 20 is in the configuration shown in FIG. 4. The in-plane torque is reduced to $T_{max}(\cos \theta_x)$ where $T_{max}$ is the maximum torque (the torque 86 in the configuration shown in FIG. 4) and $\theta_x$ is the angle at which the gyros 30 and 32 have already been rotated. The rotation of the gyros 30 and 32 is the angle at which they have been rotated about the common axis 74, away from the configuration shown in FIG. 4.

It should be noted that the flywheel rotation axes 58 and 60 rotate in respective planes 98 and 100 that are parallel to one another, and are perpendicular to the common rotation axis 74. The planes 98 and 100 are shone as lines in FIG. 5 because the planes 98 and 100 are perpendicular to the view shown in FIG. 5.

FIG. 6 shows the situation when the gyros 30 and 32 are rotated such that $\theta_x=90°$, with the flywheels 50 and 52 co-planar, and with the flywheel rotation axes 58 and 60 parallel to one another and in the same direction (out of the view shown in FIG. 6). In such a configuration the in-plane torque drops to zero, meaning that no resultant torque is produced when the gyro pair 20 is moved to this configuration. Note that the out-of-plane torques 110 and 112 of the two gyros 30 and 32 still cancel one another. Such "null points" as illustrated in FIG. 6 need to be accounted for in the positioning of the gyros 30 and 32 in order to achieve desired attitude for the flight vehicle 10 (FIG. 1).

Figure 7:
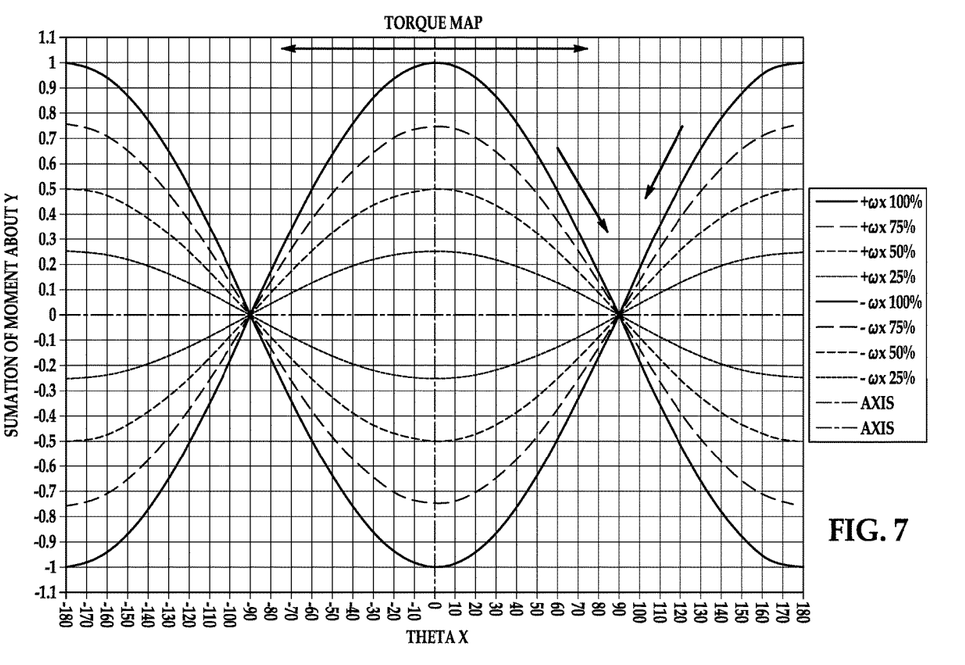
FIG. 7 is a plot of summation of moment versus angle of counter-rotation, for the gyro pair of FIG. 3.

FIG. 7 shows a torque map for a gyro pair such as the gyro pair 20 (FIG. 3). The torque map plots the summed moment in the plane of control (the plane in which the gyro pair 20 controls change of attitude of the air vehicle 10 (FIG. 1)), versus the angle $\theta_x$ that the gyros 30 and 32 (FIG. 3) are canted. The graph shows the torques for the gyros 30 and 32 individually (they are opposites of one another) for different values of spin ω for the flywheels 50 and 52 (FIG. 3). The summation of moment is proportional to the flywheel spin rate ω. In general the flywheels 50 and 52 are spun at the same rate, so that the out-of-plane moments cancel out. The change in angular momentum is the integral of the appropriate functions shown in FIG. 7.

Figure 8:
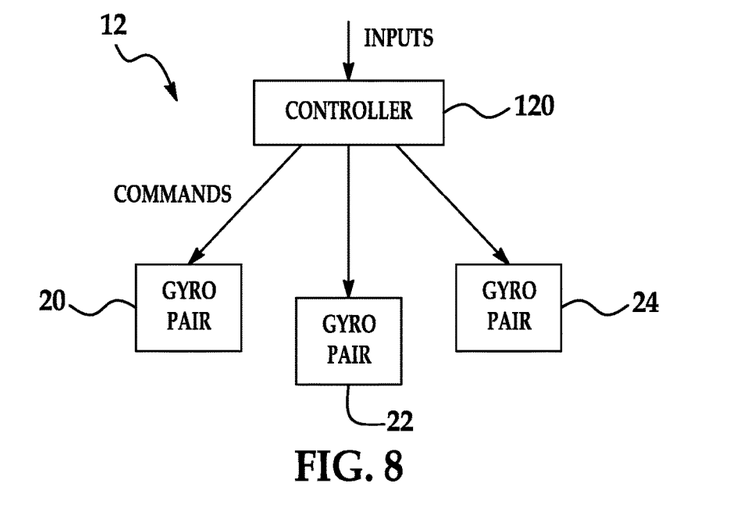
FIG. 8 is a block diagram showing interaction of a controller of the attitude control system of FIG. 2, with the gyro pairs of the attitude control system.

FIG. 8 illustrates one operational configuration for the ACS 12, with a controller 120 used to control the gyro pairs 20, 22, and 24. The controller 120 receives inputs regarding desired changes in attitude for the flight vehicle 10 (FIG. 1), and then sends commands or instructions to the gyro pairs 20, 22, and/or 24 for changes in operation of the gyro pairs 20, 22, and/or 24. The controller 120 may receive inputs on desired maneuvers and/or attitude changes from a pilot or from an autopilot, for example. The inputs may be sent from either onboard the flight vehicle 10, or remote from the flight vehicle, with the latter using a communication system, such as a radio antenna, that is operatively coupled to the controller 120. The controller 120 may process that information to produce signals to be sent to the gyro pairs 20, 22, and/or 24, to produce changes to the operating state of one or more of the gyros of one or more of the gyro pairs 20, 22, and/or 24. The outputs may take the form of instructions to be sent to the gyro pairs 20, 22, and/or 24 to position the gyros of one or more pairs (such as by counter-rotation of the gyros of a gyro pair), and/or to change the spin speeds of the gyros of a gyro pair.

The controller 120 may be and/or may include an integrated circuit or computer that processes inputs to produce desired outputs. More broadly, the controller 120 may include any of a wide variety of suitable software and/or hardware for carrying out the functions described herein. The controller 120 may use data such as that shown in FIG. 7, in order to translate desired attitude and/or attitude changes into control commands sent to the gyro pairs 20, 22, and/or 24. The data may take the form of a look-up table and/or suitable equations that enable determination of control commands, to give two examples.

Figure 9:
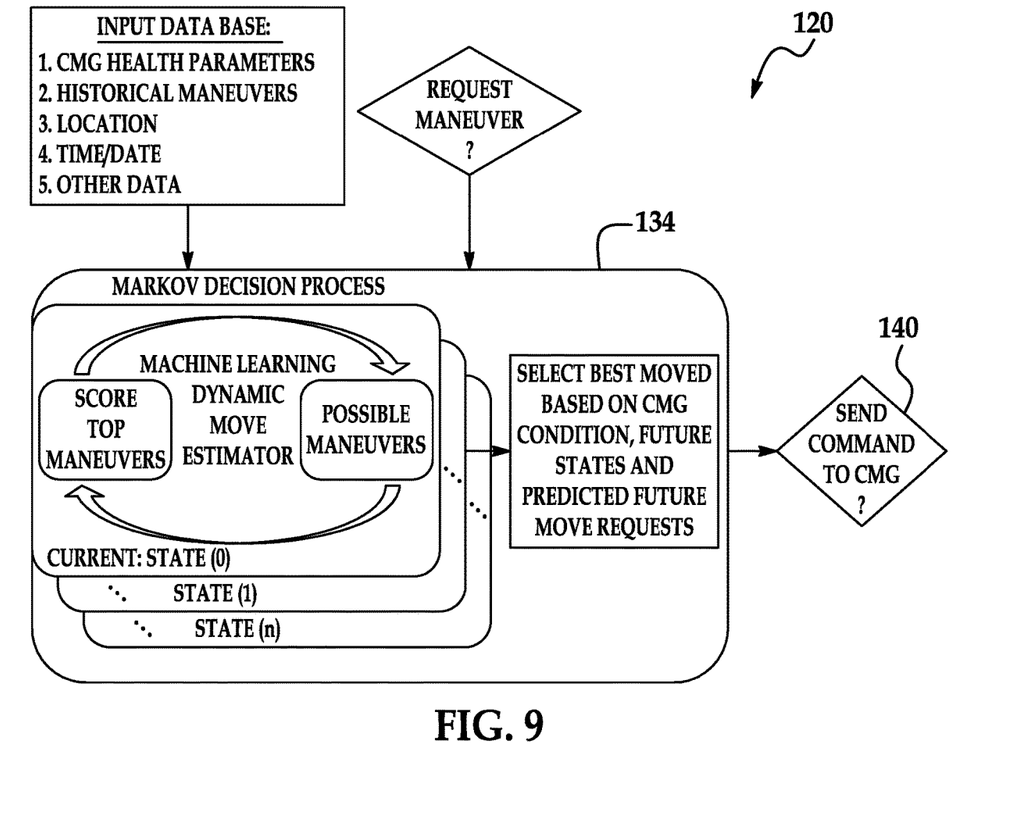
FIG. 9 is a schematic diagram illustrating aspects of the operation of the controller, according to some embodiments.

With reference now to FIG. 9, the controller 120 may be adaptive controller that employs machine learning to optimize functionality of the ACS 12, and/or to compensate for changes over time in the operation of the control moment gyros of the gyro pairs 20, 22, and/or 24 (FIG. 8). Machine learning may be sued to optimize speeds of gyro flywheels and degree of rotation of gyros by using historical data to predict the next requested move (maneuver) and using the information to perform a current move which optimizes the options and potentials of the future moves.

In addition an internal health check may be used to gather information on the health of the system, such as the functionality of the various parts of the system, such as the various gyros and the devices or means for rotating those gyros. Malfunctioning gyros can be shut down or have their operating parameters changed (for example by changing the spin rate of a flywheel of a malfunctioning gyro), with the controller compensating in the commands sent to the gyros that are still functioning.

As shown in FIG. 9, the inputs to the controller 120 may include a requested maneuver 130 as well as an input database 132. The input database 132 may include such data as control moment gyro health parameters, historical maneuvers performed by the flight vehicle 10 (FIG. 1), the location of the flight vehicle 10, the current time and date, and/or other suitable parameters. The controller 120 may use a decision-making process, such as a Markov decision process, to select a path to move from the current state to a desired attitude. This process may be based on the current conditions of the ACS 12 (FIG. 2), such as the positions of the gyros 30-40 (FIG. 2) and their capabilities (such as deteriorated operation from aging), the goal state of a desired attitude, and predicted future move requests. The result is a command or commands 140 sent to the appropriate gyro pair(s) 20, 22, and/or 24 (FIG. 8).

The Markov decision process 134 may be used with machine learning to optimize move choice based on a highest overall score for the next several predicted moves. The machine learning algorithm optimizes moves as the controlled moment gyros age and degrade over time, enabling operation with one or more non-functioning or diminished-function single-gimbal gyros.

Figure 10:
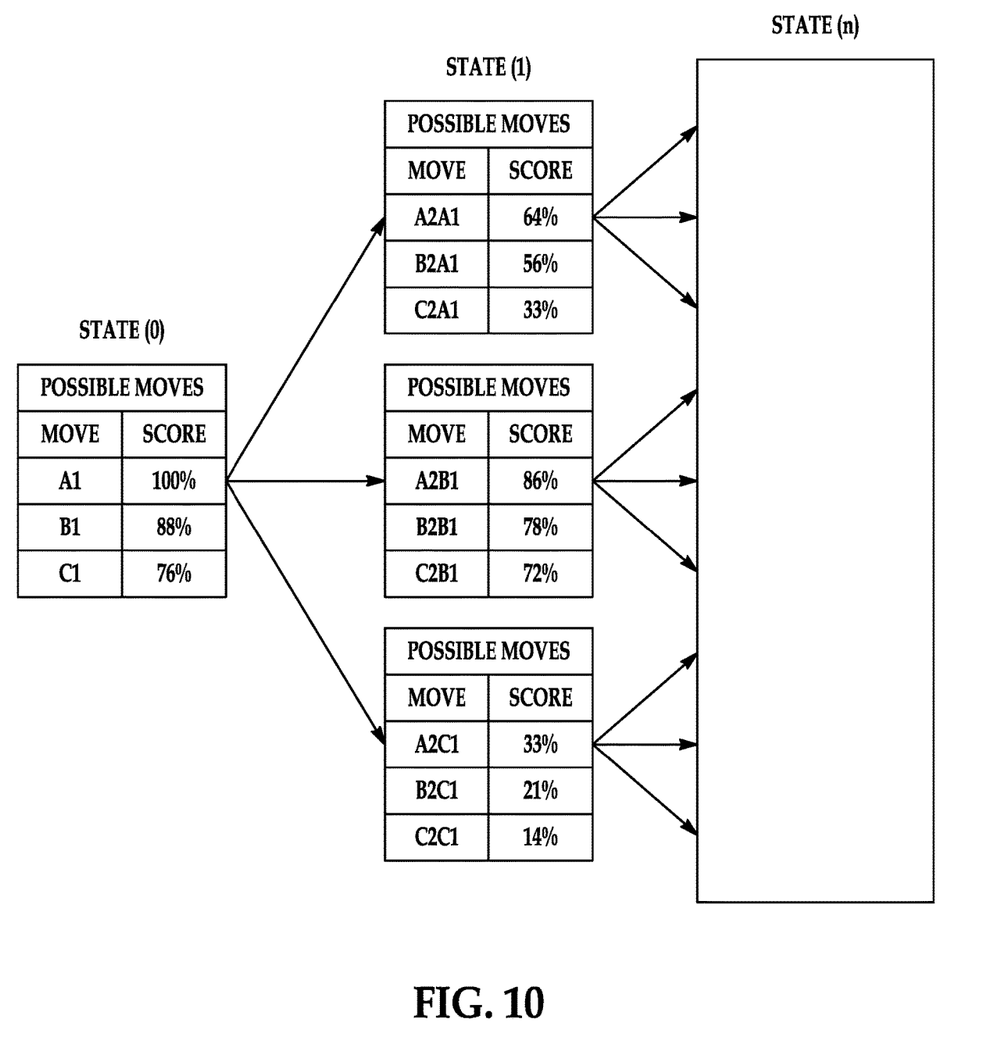
FIG. 10 is another illustration showing some aspects of operation of the controller, according to some embodiments.

FIG. 10 illustrates the process of machine learning to optimize a selection to get to a desired attitude (State (0)) might work. The highest scoring maneuver to reach State (0), maneuver A1, has a lower score when considering the limitations that this move places on a future move to State (1). When considering the (probably) future move to State (1) the highest score is in move A2B1, which requires reaching State (0) by move B1. Thus reaching State (0) by move B1 is preferred, in that it better enables future moves (or probably future moves).

By using this sort of adaptive learning the system may work around singularities of the gyros, the positions in which the gyros lose command authority. This problem may not be significant with three (or more) pairs of functioning gyros, but may become much more significant as individual gyros expire. So the intelligent machine learning will do several things: 1) create more efficient series of maneuvers; 2) adapt operations as the system degrades, with one or more gyros losing function or having reduced functionality; and 3) adapt operations to accommodate the types of maneuvers that it anticipates from its operator.

Figure 11:
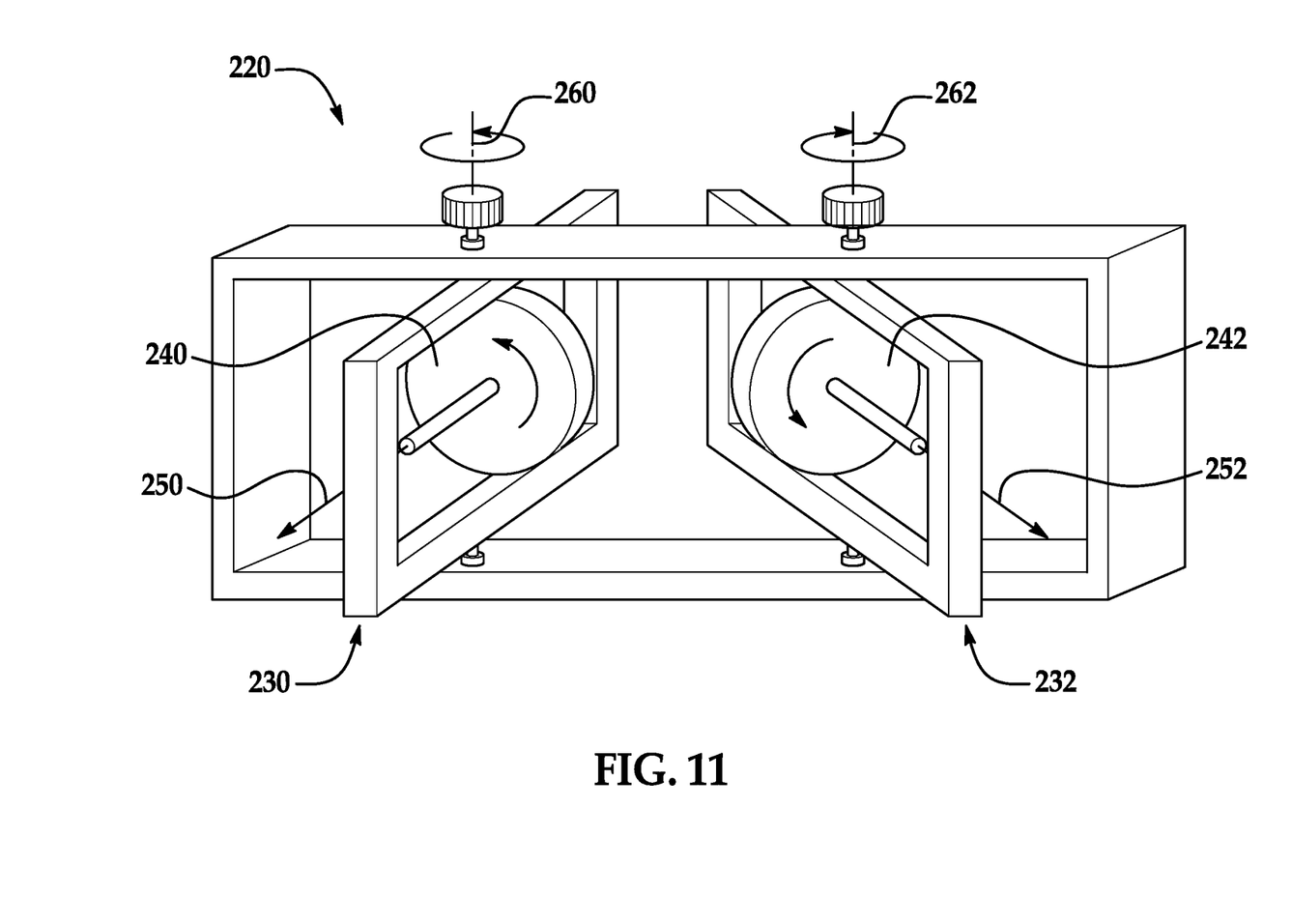
FIG. 11 is an oblique view schematically showing a gyro pair in a scissors configuration.

FIG. 11 shows an alternative scissors configuration for a gyro pair 220, a type of gyro pair which may be used in place of any or all of the paddle configuration gyro pairs 20, 22, and 24. The gyro pair 220 includes gyros 230 and 232, which have respective flywheels 240 and 242 that rotate about respective flywheel rotation axes 250 and 252. The flywheel rotation axes 250 and 252 are co-planar, and remain co-planar even when the gyros 230 and 232 change orientation. The gyros 230 and 232 may be counter-rotated relative to one another about respective gyroscope rotation axes 260 and 262. This counter-rotation may be brought about by use of a single motor, for example with suitable gearing, or by other suitable mechanisms.

The ACS 12 (FIG. 2) has been described above for use in the flight vehicle 10 (FIG. 1). The ACS 12 is particularly useful in space vehicles, such as satellites, which may need to operate for extended periods of time, such as years or decades. The ACS 12 provides reliable operation over the long term, with the ability of the controller to compensate to some extent for degradation in system performance as the system ages. The ACS 12 also may be less likely to suffer performance degradation than other prior systems, in that fewer individual gyros may need to be activated (flywheels spun) in order to effect attitude changes. In systems that utilize a "pyramid" configuration of control moment gyros, generally all of the gyros need to operate in order to accomplish attitude changes. In contrast, with the ACS 12, only a pair of gyros need to operate or be activated in order to accomplish a change in orientation about one axis.

The ACS 12 (FIG. 2) may include monitoring of various components, such as the gyros, or the motors or other devices to rotate the gyros, to detect failure or immanent failure of the components. The information from the monitoring may be used by the controller 120 to shut down certain failed or failing components, and reconfigure the operation of the ACS 12. The adaptation of the system may involve machine learning by the controller, but does not necessarily involve machine learning. Instead the controller may be configured in advance for reconfiguring operations in predetermined ways to compensate for loss of functionality or reduced functionality of one or more components.

The ACS systems described herein provide many advantages, including filling the need for a reliable and low-cost space vehicle attitude control system. For hypersonic vehicles, an ACS such as described herein avoids the unpredictable nonlinear aerodynamic control problem of using control surfaces or the like. Use of attitude control systems such as described herein also may be useful in low-observable air vehicles, such as aircraft that are intended to evade radar, by eliminating the potential problem of aileron-induced radar cross section (RCS) spikes. In addition, eliminating the need for aerodynamic control surfaces may result in reduced associated drag and thereby allow increased range, a benefit to air vehicles such as missiles.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An attitude control system comprising:
   a control moment gyro pair that includes:
      a first control moment gyro that includes a first flywheel rotatably mounted to a first frame, wherein the first flywheel rotates relative to the first frame about a first flywheel rotation axis that is perpendicular to the first flywheel;
      a second control moment gyro that includes a second flywheel rotatably mounted to a second frame, wherein the second flywheel rotates relative to the second frame about a second flywheel rotation axis that is perpendicular to the second flywheel; and
      one or more actuators that selectively counter-rotate the first control moment gyro, and the second control moment gyro, so as to rotate the first flywheel rotation axis and the second flywheel rotation axis in opposite directions to cant the first control moment gyro relative to the second control moment gyro;
   wherein the one or more actuators rotate the first flywheel and the first frame, and the second flywheel and the second frame, so as to rotate the first flywheel rotation axis and the second flywheel rotation axis within respective offset parallel planes.

2. The device of claim 1, wherein the first control moment gyro and the second control moment gyro are both rotated by the one or more actuators about a common gyro pair rotation axis.

3. The device of claim 2, wherein the gyro pair rotation axis is perpendicular to planes in which the flywheel rotation axes rotate when the control moment gyros are rotated.

4. The device of claim 1,
   wherein the first control moment gyro includes a first spin motor for rotating the first flywheel about the first flywheel rotation axis, relative to the first frame; and
   wherein the second control moment gyro includes a second spin motor for rotating the second flywheel about the second flywheel rotation axis, relative to the second frame.

5. The device of claim 4, wherein the spin motors are servo motors.

6. The device of claim 4, wherein the spin motors are variable speed motors.

7. The device of claim 1,
   wherein the control moment gyro pair is a first control moment gyro pair; and
   further comprising a second control moment gyro pair and a third control moment gyro pairs; and
   wherein the control moment gyro pairs control attitude about respective control moment axes.

8. The device of claim 7, wherein the control moment axes are all perpendicular to one another.

9. The device of claim 7, further comprising a controller that is operatively coupled to the control moment gyro pairs, to control the control moment gyro pairs to achieve a desired attitude about the control moment axes.

10. The device of claim 9, wherein the controller controls counter-rotation of gyros of the control moment gyro pairs.

11. The device of claim 9, wherein the controller controls spin rate of flywheels of gyros.

12. The device of claim 9, wherein the controller is an adaptive controller, able to compensate for reductions in functionality of one or more of the gyros.

13. The device of claim 9, wherein the controller is a machine learning controller.

14. The device of claim 1, wherein the attitude control system is part of a flight vehicle.

15. An attitude control system comprising:
   three control moment gyro pairs for controlling attitude in respective control moment axes, wherein each of the control moment gyro pairs includes:
      a first control moment gyro that includes a first flywheel rotatably mounted to a first frame, wherein the first flywheel rotates relative to the first frame about a first flywheel rotation axis that is perpendicular to the first flywheel;
      a second control moment gyro that includes a second flywheel rotatably mounted to a second frame, wherein the second flywheel rotates relative to the second frame about a second flywheel rotation axis that is perpendicular to the second flywheel; and
      one or more actuators that selectively counter-rotate the first control moment gyro as a unit, with the first flywheel and the first frame rotating together, and the second control moment gyro as a unit, with the second flywheel and the second frame rotating together, so as to rotate the first flywheel rotation axis and the second flywheel rotation axis in opposite directions to cant the first control moment gyro relative to the second control moment gyro;
      wherein the one or more actuators rotate the first flywheel and the first frame, and the second flywheel and the second frame, so as to rotate the first flywheel rotation axis and the second flywheel rotation axis within respective offset parallel planes.

16. The attitude control system of claim 1, wherein the one or more actuators includes a single actuator that counter-rotates both the first control moment gyro and the second control moment gyro.

17. The attitude control system of claim 1, wherein the one or more actuators includes separate respective actuators to effect the counter-rotation of the first control moment gyro and the second control moment gyro.

18. The attitude control system of claim 15, wherein for each of the control moment gyro pairs the one or more actuators includes separate respective actuators to effect the counter-rotation of the first control moment gyro and the second control moment gyro.

19. The attitude control system of claim 1,
   wherein the first flywheel rotation axis is fixed relative to the first frame; and
   wherein the second flywheel rotation axis is fixed relative to the second frame.

20. The attitude control system of claim 1, wherein the one or more actuators selectively counter-rotate the first control moment gyro as a unit, with the first flywheel and the first frame rotating together, and the second control moment gyro as a unit, with the second flywheel and the second frame rotating together.

21. The device of claim 16, wherein the single actuator includes a motor.

22. The device of claim 21, wherein a shaft of the motor engages gearing on the frames.

* * * * *